United States Patent [19]
Notsu

[11] Patent Number: 5,949,190
[45] Date of Patent: Sep. 7, 1999

[54] INTERNAL COMBUSTION ENGINE-DRIVEN DISCHARGE LAMP LIGHTING APPARATUS

[75] Inventor: Tooru Notsu, Numazu, Japan

[73] Assignee: Kokusan Denki Co., Ltd., Shizuoka-ken, Japan

[21] Appl. No.: 08/915,834

[22] Filed: Aug. 21, 1997

[30] Foreign Application Priority Data

Aug. 27, 1996 [JP] Japan .................................. 8-225491

[51] Int. Cl.$^6$ ........................ H05B 41/231; H02K 11/00
[52] U.S. Cl. ............... 315/76; 315/209 CD; 315/243; 315/302; 310/73; 310/113
[58] Field of Search ............................. 315/76, 78, 163, 315/209 R, 209 CD, 240, 241, 243, 300, 302; 310/73, 113; 362/192

[56] References Cited

U.S. PATENT DOCUMENTS 4,749,914  6/1988  Fehér et al. ........................ 315/246

*Primary Examiner*—David Mis
*Attorney, Agent, or Firm*—Pearne, Gordon, McCoy & Granger LLP

[57] ABSTRACT

An internal combustion engine-driven discharge lamp lighting apparatus including an internal combustion engine and a generator driven by the internal combustion engine to generate an output voltage and capable of lighting a high-voltage discharge lamp such as a high-voltage mercury lamp, a metal halide lamp or the like without using any ballast including a leakage transformer, to thereby eliminate problems due to incorporation of the ballast therein.

6 Claims, 6 Drawing Sheets

INTERNAL COMBUSTION ENGINE-DRIVEN DISCHARGE LAMP LIGHTING APPARATUS

BACKGROUND OF THE INVENTION

This invention relates to a discharge lamp lighting apparatus driven by an internal combustion engine, and more particularly to an internal combustion engine-driven discharge lamp lighting apparatus which is adapted to light a high-pressure discharge lamp such as a high-pressure mercury lamp, a metal halide lamp, a high-pressure sodium lamp or the like.

Conventionally, a synchronous generator driven by an internal combustion engine has been generally used as a power supply unit for lighting an illuminator used in a construction site, that for leisure time amusement or that for disaster relief. Also, a discharge lamp such as a mercury lamp or the like has been recently substituted for an incandescent lamp as an illuminator for a construction site or that for leisure time amusement.

As commonly known in the art, a discharge lamp has negative impedance characteristics, so that once it starts discharge, an impedance thereof is reduced with an increase in current. Thus, a failure in restriction of the current causes an unrestricted increase in discharge current, leading to breakdown of the discharge lamp. In order to avoid such a problem, a conventional discharge lamp lighting apparatus driven by an internal combustion engine includes a ballast including a leakage transformer or a choke coil arranged between a power supply and the discharge lamp, to thereby apply a power voltage through the leakage transformer or choke coil to the discharge lamp.

Also, lighting of a high-pressure discharge lamp such as a high-pressure mercury lamp, a metal halide lamp or the like requires to apply a high voltage across the discharge lamp during starting of the discharge lamp, so that a pulse generation circuit is provided for generating a high-voltage pulse during starting of the discharge lamp.

A pulse generation circuit arranged for this purpose in the conventional discharge lamp lighting apparatus is constructed so as to provide a resonance circuit utilizing an impedance of the ballast during starting of the discharge lamp, to thereby generate a high-voltage pulse.

Thus, the conventional internal combustion engine-driven discharge lamp lighting apparatus requires to arrange the ballast in addition to the generator, leading to an increase in cost.

Also, the ballast serves as an inductive load, to thereby be deteriorated in power factor, so that arrangement of the ballast unavoidably causes an increase in burden on the generator.

Further, arrangement of the ballast between the generator and the discharge lamp causes an inrush current in a large amount to be flowed through an armature coil of the generator during starting of the discharge lamp, resulting in the generator being restricted to driving of a lamp load at a level only about one half to one third as large as rating of the generator, so that the generator is required to be increased in capacity, leading to an increase in cost.

Furthermore, when the discharge lamp lighting apparatus is so constructed that a voltage of the generator driven by an internal combustion engine is applied to the discharge lamp through the ballast and the pulse generation circuit for generating a high-voltage pulse utilizes an impedance of the ballast, the high-voltage pulse is applied directly to the armature coil of the generator. This requires to increase a degree of insulation of the armature coil of the generator, leading to an increase in cost of the generator correspondingly.

Moreover, in the conventional discharge lamp lighting apparatus wherein the high-voltage pulse generation circuit is constructed utilizing an impedance of the ballast while using the internal combustion engine-driven generator as a power supply therefor, a pulse current is flowed through the armature coil of the generator during starting of the discharge lamp, to thereby cause loss in the armature coil, resulting in a failure to fully or satisfactorily utilize energy of the high-voltage pulse.

SUMMARY OF THE INVENTION

The present invention has been made in view of the foregoing disadvantages of the prior art.

Accordingly, it is an object of the present invention to provide an internal combustion engine-driven discharge lamp lighting apparatus which is capable of lighting a high-voltage discharge lamp such as a high-voltage mercury lamp, a metal halide lamp or the like without using any ballast constituted by a leakage transformer, to thereby eliminate problems due to incorporation of the ballast therein.

It is another object of the present invention to provide an internal combustion engine-driven discharge lamp lighting apparatus which is capable of preventing application of a high-voltage pulse to an armature coil of a generator, to thereby facilitate a design for insulation of the generator.

It is a further object of the present invention to provide an internal combustion engine-driven discharge lamp lighting apparatus which is capable of preventing a part of energy of a high-voltage pulse from being lost in an armature coil, to thereby ensure starting of a high-voltage discharge lamp with increased efficiency.

It is still another object of the present invention to provide an internal combustion engine-driven discharge lamp lighting apparatus which is capable of lighting a discharge lamp without excessively increasing a capacitor of a generator.

The present invention is directed to an internal combustion engine-driven discharge lamp lighting apparatus which includes an internal combustion engine and a generator driven by the internal combustion engine to generate an output voltage. The discharge lamp lighting apparatus includes a pulse generation circuit for generating a high-voltage pulse at least during starting of a discharge lamp using the generator as a power supply therefor. The high-voltage pulse generated by the pulse generation circuit is applied to the discharge lamp while being superposed on the output voltage of the generator. The discharge lamp lighting apparatus also includes a bypass capacitor connected in parallel across the generator to bypass the high-voltage pulse from the generator. The pulse generation circuit is constructed so as to generate a high-voltage pulse having a level or magnitude required for permitting a voltage applied to the discharge lamp during starting of the discharge lamp to be increased to a level or magnitude equal to a break-down voltage of the discharge lamp or more. The generator is constructed so as to have output voltage-output current characteristics exhibiting drooping characteristics or characteristics of permitting the output voltage of the generator to be rapidly decreased with an increase in output current of the generator, resulting in the output current being limited to a predetermined level or below. The output voltage-output current characteristics of the generator are set so as to permit a magnitude of each of a voltage across the discharge lamp and a discharge current of the discharge lamp at a steady state to be kept within a rated range. The generator has a short-circuit current set in a magnitude so as to restrict a magnitude of the discharge current of the discharge lamp flowing immediately after starting of discharge of the discharge lamp to an allowable value or below.

The above-described construction of the present invention permits the pulse generation circuit to generate a high-voltage pulse during starting of the discharge lamp to increase a voltage across the discharge lamp to a level equal to a break-down voltage or above, so that the discharge lamp starts discharge. This results in an impedance thereof being rapidly reduced, leading to an increase in discharge current of the discharge lamp. The discharge current immediately after starting of the discharge is increased with an increase in short-circuit current of the generator. In the present invention, the short-circuit current of the generator has a level or magnitude set so as to restrict the discharge current immediately after starting of the discharge to a magnitude allowable for the discharge lamp or below while permitting output voltage-output current characteristics of the generator to exhibit drooping characteristics, so that the discharge current immediately after starting of the discharge may be limited to an allowable level or below. When the discharge lamp starts discharge, resulting in a temperature thereof being increased, an internal impedance thereof is increased, leading to a decrease in discharge current thereof. When the discharge lamp reaches a thermally stable state or a steady state, it is rendered stable at an intersection between an impedance curve of the discharge lamp and the output voltage-output current characteristics of the generator at that time. In the present invention, the output voltage-output current characteristics of the generator are set so as to permit a magnitude of each of a voltage across the discharge lamp and a discharge current of the discharge lamp at the steady state to be kept within a rated range, so that the discharge lamp may be shifted to the steady state after starting thereof, to thereby render the lighting stable.

As described above, the present invention is so constructed that the generator exhibiting drooping characteristics is set so as to have characteristics suitable for lighting the discharge lamp and the pulse generation circuit constructed so as to generate a high-voltage pulse using the generator as a power supply therefor is arranged, resulting in the high-voltage pulse generated by the pulse generation circuit being applied to the discharge lamp while being superposed on the output voltage of the generator. Such construction permits the high-voltage discharge lamp to be lighted by means of the output voltage of the generator without using a ballast constituted by a leakage transformer, leading to a reduction in cost and small-sizing of the lighting apparatus.

In particular, in the present invention, the bypass capacitor is connected in parallel across the generator to bypass the high-voltage pulse from the generator, to thereby prevent a part of energy of the high-voltage pulse from being partially lost due to flowing of a pulse current through an armature coil of the generator. This permits energy of the high-voltage pulse to be effectively utilized, to thereby ensure starting of the discharge lamp with increased efficiency.

Also, a bypass capacitor generally exhibits an impedance reduced with respect to a high-voltage pulse, so that connection of the bypass capacitor across the generator in the present invention prevents a voltage of an increased level from being applied to the armature coil of the generator when the high-voltage pulse is generated, to thereby facilitate a design for insulation of the generator.

Further, such connection of the capacitor across the generator as described above permits a leading phase current flowing through the armature coil of the generator to exhibit a magnetization action to increase the output voltage of the generator, so that a size of the generator for lighting the discharge lamp may be reduced as compared with a size of the generator which is not provided with such a capacitor.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

The present invention is constructed so as to light a discharge lamp by means of an output voltage of a generator driven by an internal combustion engine without using any ballast. When an output voltage of the generator at a no-load sate or a no-load output voltage thereof is permitted to be higher than a break-down voltage of the discharge lamp, output voltage-output current characteristics of the generator exhibit drooping characteristics wherein an output voltage of the generator is rapidly reduced with an increase in output voltage thereof to restrict the output current to a predetermined level or below. Thus, a short-circuit current of the generator is set to restrict a discharge current of the discharge lamp immediately after starting of the discharge to an allowable level or below, to thereby permit the discharge lamp to be lighted by merely applying an output voltage of the generator directly to the discharge lamp.

However, when a discharge lamp to be lighted is a high-voltage discharge lamp, it is impossible to increase a no-load output voltage of the generator to a level above a break-down voltage of the discharge lamp, so that mere application of an output voltage of the generator to the discharge lamp fails to light the discharge lamp. For example, supposing that a metal halide lamp of 40W is to be lighted while keeping an operation point of the lamp at a steady state set near a maximum output point of the generator, an output voltage of the generator at a no-load state or a no-load output voltage thereof is caused to have a level as low as about 200 to 230 V. However, a breakdown voltage of the metal halide lamp is at a level as high as 2000 to 3000 V, so that mere application of the output voltage of the generator to the discharge lamp fails to start discharge of the discharge lamp.

In view of the foregoing, the present invention is generally constructed in such a manner that a pulse generation circuit for generating a high-voltage pulse while using a generator as a power supply therefor is arranged so as to apply the high-voltage pulse to the discharge lamp while superposing the high-voltage pulse on an output voltage of the generator.

Now, an internal combustion engine-driven discharge lamp lighting apparatus according to the present invention will be described hereinafter with reference to the accompanying drawings.

Figure 1:
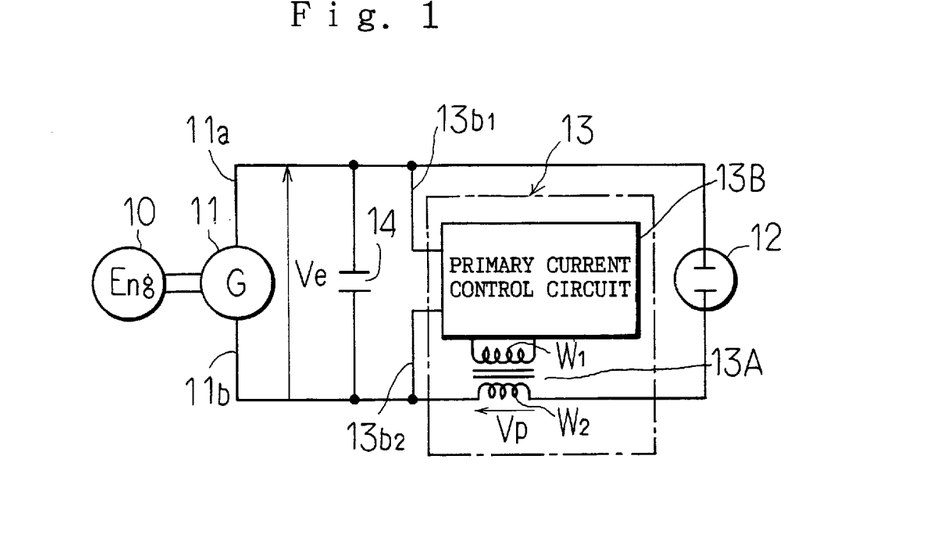
FIG. 1 is a block diagram showing an embodiment of an internal combustion engine-driven discharge lamp lighting apparatus according to the present invention.

Referring first to FIG. 1, an embodiment of an internal combustion engine-driven discharge lamp lighting apparatus according to the present invention is illustrated, wherein reference numeral 10 designates an internal combustion engine, 11 is an AC generator driven by the internal combustion engine 10 to generate a single-phase AC voltage, 12 is a high-voltage discharge lamp such as a metal halide lamp or the like, 13 is a pulse generation circuit for generating a high-voltage pulse at least during starting of the discharge lamp while using the generator 11 as a power supply therefor, and 14 is a bypass capacitor connected in parallel between output terminals 11a and 11b of the generator 11 or connected in parallel across the generator 11 to permit a pulse current flowing when the pulse generation circuit 13 generates a high-voltage pulse Vp to be bypassed from the generator 11.

In the illustrated embodiment, the pulse generation circuit 13 is constituted by a step-up transformer 13A including a primary winding W1 and a secondary winding W2 and a primary current control circuit 13B adapted to control a primary current of the step-up transformer 13A. The primary current control circuit 13B includes power input terminals 13b1 and 13b2, which are connected to the output terminals 11a and 11b of the generator 11, respectively. The output terminal 11a of the generator 11 is connected to one end of the discharge lamp 12 and the output terminal 11b is connected through the secondary winding W2 of the step-up transformer 13A to the other end of the discharge lamp 12. Thus, an output voltage of the generator 11 is permitted to be applied to the discharge lamp 12 through the secondary winding W2 of the step-up transformer 13A.

The primary current control circuit 13B of the pulse generation circuit 13 causes a current flowing through the primary winding W1 of the step-up transformer 13A to be rapidly varied during at least one of positive and negative half cycles of an output of the generator 11, resulting in a high-voltage pulse Vp which has the same polarity as that of the output voltage of the generator 11 being induced across the secondary winding W2 of the step-up transformer 13A. The high-voltage pulse Vp thus induced is superposed on an output voltage V of the generator 11 and applied to the discharge lamp 12. In order to facilitate starting of the discharge lamp, the primary current control circuit 13B is preferably constructed so as to permit the high-voltage pulse Vp to be generated near a peak value of the output voltage of the generator 11.

Figure 2:
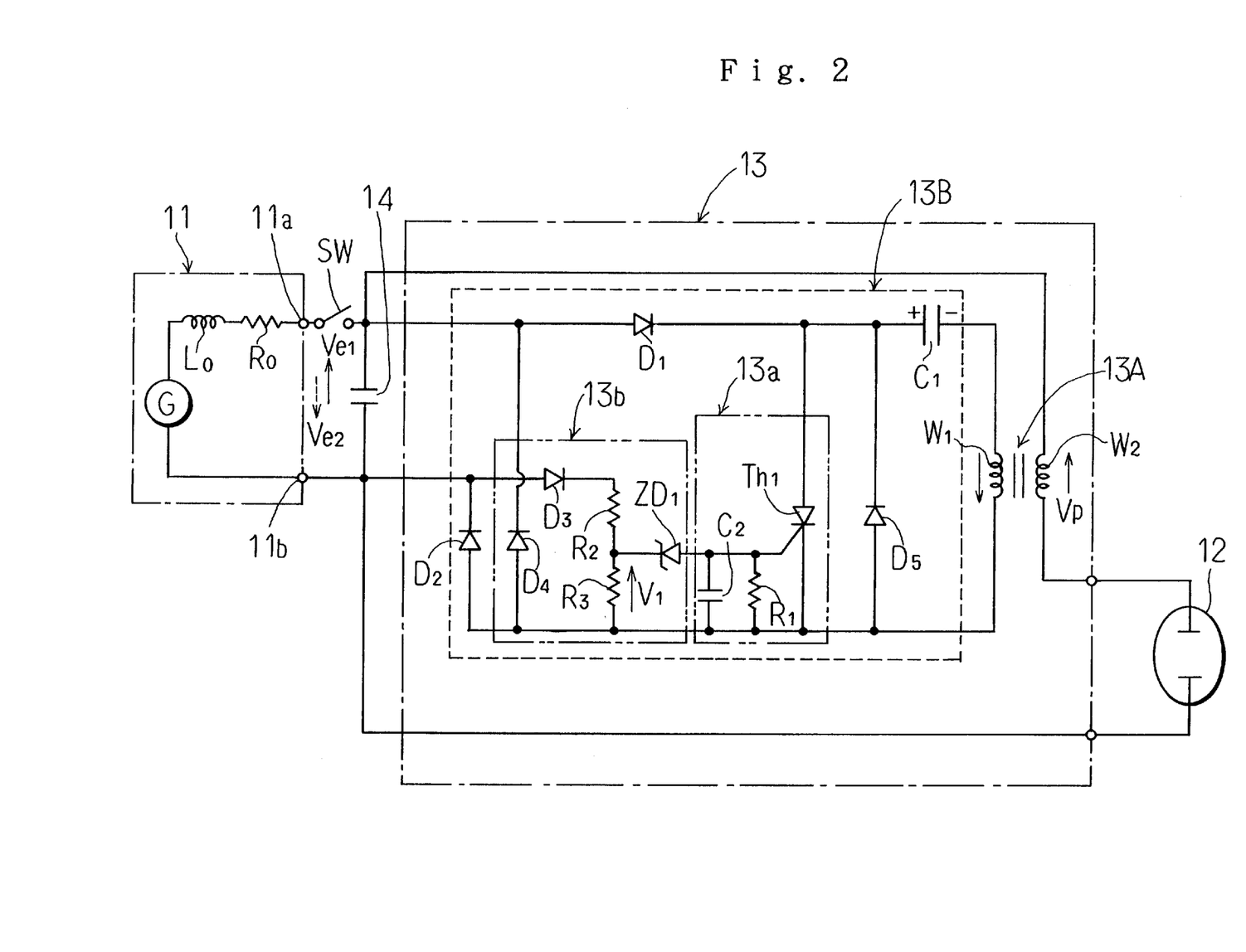
FIG. 2 is a circuit diagram showing details of the discharge lamp lighting apparatus of FIG. 1.

FIG. 2 shows details of the discharge lamp lighting device of FIG. 1. In FIG. 2, Lo and Ro designate an internal inductance of the generator 11 and an internal resistor thereof, respectively, and 13 is the pulse generation circuit including the step-up transformer 13A and primary current control circuit 13B as described above. In the illustrated embodiment, the generator 11 comprises an AC magneto which includes a magnet rotor and a stator including an armature coil, resulting in generating an AC voltage.

The primary current control circuit 13B shown in FIG. 2 includes a pulse generation capacitor C1 provided on a primary side of the step-up transformer 13A, a capacitor charging circuit for charging the pulse generation capacitor at one of polarities by means of the output voltage of the generator 11, a discharge switch 13a for discharging charges in the pulse generation capacitor C1 through the primary coil W1 of the step-up transformer 13A when it is turned on, a discharge switch trigger circuit 13b for feeding the discharge switch 13a with a trigger signal to turn on the discharge switch 13a when the output voltage of the generator reaches a predetermined level. The primary current control circuit 13B thus constructed functions to induce a high-voltage pulse on the secondary winding W2 of the step-up transformer 13A due to discharge of charges in the pulse generation capacitor C1. The output voltage of the generator 11 is applied through the secondary winding W2 of the step-up transformer 13A to the discharge lamp 12.

More particularly, the primary winding W1 of the step-up transformer 13A is connected at one end thereof to one end of the pulse generation capacitor C1, which is then connected at the other end thereof to a cathode of a diode D1. The diode has an anode connected through a switch SW to one output terminal 11a of the generator 11. Also, the primary winding W1 is connected at the other end thereof to the other output terminal 11b of the generator 11.

The capacitor C1 and primary winding W1 are connected at the other end thereof to an anode of a thyristor Th1 and a cathode thereof, respectively, and a gate-cathode circuit of the thyristor Th1 has a resistor R1 for protection and a capacitor C2 connected in parallel thereto. The generator 11 is connected at the other output terminal 11b to an anode of a diode D3, and a resistance type voltage dividing circuit constituted by a series circuit of resistors R2 and R3 is connected between a cathode of the diode D3 and a line connected to the cathode of the thyristor Th1. The voltage dividing circuit has a voltage dividing point connected to a gate of the thyristor Th1 through a Zener diode ZD1 of which a cathode is arranged so as to face the voltage dividing point. Also, between a line connected to the cathode of the thyristor Th1 and the one output terminal 11a of the generator 11 is connected a diode D4 of which a cathode is arranged so as to face the output terminal 11a of the generator 11. The thyristor Th1 has an anode-cathode circuit connected in parallel to a diode D5 of which a direction is opposite to the thyristor Th1. The diode D5 functions to return energy collected in the primary winding W1 of the step-up transformer 13A to the capacitor C1.

In FIG. 2, a circuit which circulatedly extends from the generator 11 through the switch SW, diode D1, capacitor C1, primary winding W1 and diode D2 to the generator 11 constitutes the capacitor charging circuit briefly described above which functions to permit the pulse generation capacitor C1 arranged on the primary side of the step-up transformer to be charged at one of polarities by means of an output voltage Ve1 of one half cycle of the generator 11.

Also, the thyristor Th1, resistor R1 and capacitor C2 cooperate with each other to provide the discharge switch 13a for discharging charges in the capacitor C1 through the primary winding W1 of the step-up transformer 13A, whereas the voltage dividing circuit constituted by the diodes D3, D4 and resistors R2, R3 and the Zener diode ZD1 cooperate with each other to constitute the above-described discharge switch trigger circuit 13b for feeding the discharge switch 13a with a trigger signal when an output voltage Ve2 of the other half cycle of the generator 11 reaches a predetermined level Vs.

The predetermined level Vs described above depends on a resistance value of each of the resistors R2 and R3 and a Zener voltage Vz of the Zener diode ZD1. In the illustrated embodiment, the level Vs is set to be lower than a peak value $Va_{peak}$ of an output voltage Va of the generator 11 at a no-load state and higher than a peak value $VL_{peak}$ of an output voltage (rated voltage) of the generator when a rated discharge current flows through the discharge lamp 12. More particularly, in the discharge lamp lighting device shown in FIG. 2, the resistance value of the resistors R2 and R3 and the Zener voltage Vz of the Zener diode ZD1 are so set that only when the output voltage (peak value) of the generator 11 is above the rated voltage VL (peak value) of the discharge lamp 12, the output voltage V1 of the voltage dividing circuit constituted by the resistors R2 and R3 exceeds the Zener voltage Vz of the Zener diode ZD1 to feed the thyristor Th1 with the trigger signal.

Reference numeral 14 designates a bypass capacitor 14, which functions to bypass the high-voltage pulse Vp generated by the pulse generation circuit 13 from the generator 11. Therefore, the bypass capacitor 14 is preferably constituted by a film capacitor exhibiting good radiofrequency characteristics.

In the discharge lamp lighting apparatus shown in FIG. 2, closing of the switch SW while keeping the generator 11 driven permits the pulse generation capacitor C1 to be charged at the polarity shown in FIG. 2 through the switch SW, diode D1, primary winding W1 and diode D2 when the generator 11 generates the output voltage Ve1 of one half cycle. A charging voltage of the capacitor C1 during starting of the discharge lamp 12 is rendered substantially equal to the peak value $Va_{peak}$ of the no-load output voltage of the generator 11 or the output voltage thereof at a no-load state. When the generator 11 generates the output voltage Ve2 of the other half cycle to cause the peak value of the output voltage Ve2 to exceed the predetermined level Vs, the output voltage V1 of the voltage dividing circuit constituted by the resistors R2 and R3 exceeds the Zener voltage Vz of the Zener diode ZD1, to thereby feed the thyristor Th1 with a trigger signal. This permits the thyristor Th1 to be turned on, resulting in charges in the capacitor C1 being discharged through the thyristor Th1 and primary winding W1 of the step-up transformer 13A. When a discharge current of the capacitor C1 flows into the primary winding W1 of the step-up transformer 13A, a pulse-like voltage in a direction of preventing flowing of the discharge current is induced across the primary winding W1. The voltage thus induced is boosted by the step-up transformer 13, so that the high-voltage pulse Vp may be induced across the secondary winding W2 of the step-up transformer 13. The high-voltage pulse Vp induced is applied to the discharge lamp 12 while being superposed on the output voltage of the other half cycle of the generator 11.

In the pulse generation circuit 13 shown in FIG. 2, a direction of turning of the secondary winding W2 of the step-up transformer 13A is set so as to permit a polarity of the high-voltage pulse Vp to be the same as that of the output voltage of the other half cycle of the generator 11. In other words, it is set so as to permit the high-voltage pulse Vp to be applied to the discharge lamp 12 while being superposed on the output voltage Ve2 of the other half cycle of the generator 11 at the same polarity.

Also, in the illustrated embodiment, the voltage dividing circuit constituted by the resistors R2 and R3 preferably has a voltage dividing ratio set so as to feed the thyristor Th1 with a trigger signal in proximity to a peak of the output voltage Ve2 of the other half cycle generated by the generator 11, resulting in the high-voltage pulse Vp being generated.

As described above, when the charging voltage of the pulse generation capacitor C1 during starting of the discharge lamp is at a level of the peak value $Va_{peak}$, a peak value Vpm of the high-voltage pulse Vp induced across the secondary winding W2 of the step-up transformer 13A is substantially equal to $n \times Va_{peak}$ supposing that a turn ratio of the primary winding W1 of the step-up transformer 13A to the secondary winding W2 thereof is 1:n. Supposing that the high-voltage pulse Vp is generated at a peak position of the output voltage of the generator 11, a voltage applied to the discharge lamp 12 during starting of the discharge lamp 12 is given substantially by $(n+1) Va_{peak}$.

The generator 11 incorporated in the discharge lamp lighting apparatus of the illustrated embodiment is constructed so as to permit output voltage-output current characteristics thereof to exhibit drooping characteristics and has an output voltage at a no-lead state or a no-load output voltage set so as to permit a voltage applied to the discharge lamp 12 to be kept higher than a break-down voltage of the discharge lamp 12 during starting of the discharge lamp. Also, the output voltage-output current characteristics of the generator 11 are so set that a short-circuit current ic of the generator 11 has a level or magnitude required to restrict a discharge current of the discharge lamp 12 immediately after starting of discharge thereof or during a cold state to a allowable value or below and a terminal voltage VL of the discharge lamp and a discharge current iL thereof during a steady state are kept within a rated range.

The drooping characteristics of the generator 11 indicate characteristics of rapidly reducing an output voltage thereof with an increase in output current thereof to restrict the output current to a predetermined level or below. Such characteristics may be readily exhibited by suitably setting the number of turns of the armature winding or coil of the generator or adjusting a polar arc angle of magnetic poles of each of the rotor and stator so as to increase a leakage flux flowing through magnetic poles rendered adjacent to each other when the magnetic poles of the rotor are rendered opposite to those of the stator.

For example, when the generator 11 incorporated in the illustrated embodiment is constituted by an AC magneto, the AC magneto is permitted to readily exhibit drooping characteristics by suitably setting the number of turns of an armature coil of the AC magneto or rather largely adjusting a polar arc angle of magnetic poles of each of both rotor and stator of the AC magneto so as to increase a leakage flux flowing through magnetic poles rendered adjacent to each other when the magnetic poles of the rotor are rendered opposite to those of the stator.

Figure 9:
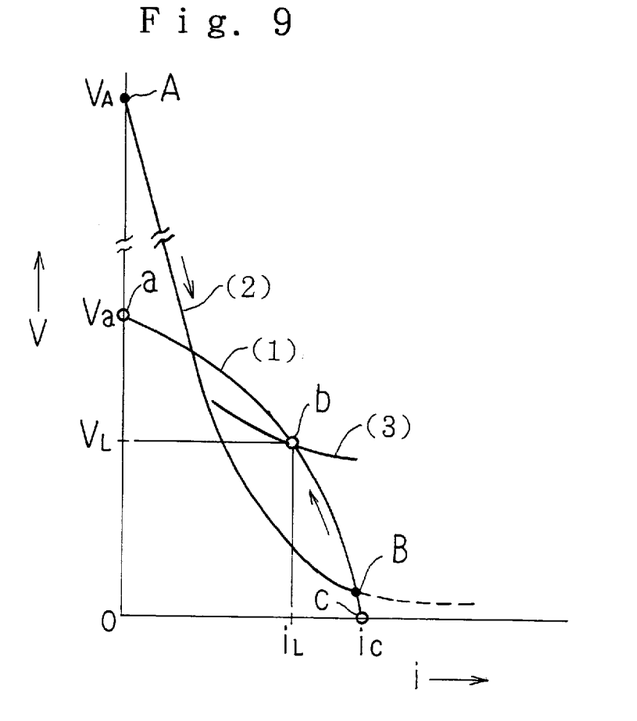
FIG. 9 is a diagrammatic view showing output voltage-output current characteristics of a generator incorporated in the present invention and voltage-current characteristics of a discharge lamp; an FIG. 10 is a circuit diagram showing another embodiment of an internal combustion engine-driven discharge lamp lighting apparatus according to the present invention.

The generator 11 incorporated in the illustrated embodiment may exhibit such output voltage V-output current i characteristics as indicated at a curve (1) in FIG. 9 by way of example. Also, voltage-current characteristics of the high-pressure discharge lamp such as a metal halide lamp or the like at a cold state may be indicated at a curve (2) in FIG. 9 by way of example. The discharge lamp 12, as shown in FIG. 9, exhibits negative impedance characteristics in which a voltage across the lamp 12 or a terminal voltage thereof is decreased with an increase in discharge current.

In FIG. 9, a voltage VA at a point A on the curve (2) indicates a break-down voltage, so that lighting of the discharge lamp 12 requires to apply a voltage equal to the voltage VA at the point A or more across the discharge lamp. In the illustrated embodiment, the no-load output voltage Va of the generator 11 and a boosting ratio of the step-up transformer 13A are set so as to permit a voltage applied across the discharge lamp to be higher than the break-down voltage VA when the high-pressure pulse Vp is generated during starting of the discharge lamp, resulting in the discharge lamp 12 starting discharge when the switch SW is closed to permit the pulse generation circuit 13 to generate the high-voltage pulse Vp.

When the discharge lamp 12 starts discharge, the discharge lamp is rapidly decreased in impedance as indicated at the curve (2) in FIG. 9, so that the discharge current is increased to a point B at which the curve (2) intersects the curve (1) indicating the output voltage-output current characteristics of the generator 11. The discharge current at the point B indicates a discharge current of the discharge lamp at a cold state immediately after starting of the discharge. In the illustrated embodiment, the output voltage-output current characteristics of the generator 11 are utilized as the drooping characteristics, resulting in a level of the short-circuit current ic (current at a point c in FIG. 9) of the generator being so set that the discharge current immediately after starting of the discharge is restricted to an allowable level or below. This effectively prevents the discharge current of the discharge lamp immediately after starting of the discharge from exceeding the allowable level.

An increase in temperature of the discharge lamp 12 leads to an increase in internal impedance of the discharge lamp to decrease the discharge current; so that when the discharge lamp 12 reaches a thermally stable state or a steady state, it is stabilized at an intersection between an impedance curve (3) of the discharge lamp 12 and the curve (2) of the output voltage-output current characteristics. In the illustrated embodiment, the output voltage-output current characteristics of the generator 11 is so set that the voltage VL across the discharge lamp and the discharge current iL thereof represented by, for example, a voltage current at a point b in FIG. 9 obtained when the discharge lamp 12 is at a steady state or at a thermally stable state. This ensures flowing of the discharge current substantially falling within a rated range during a steady state of the discharge lamp, to thereby permit a voltage across the discharge lamp 12 to be substantially equal to a rated voltage thereof.

More specifically, in the illustrated embodiment, the characteristics of the generator 11 are so set that the curve (1) indicating the output voltage-output current characteristics thereof passes through, for example, the points a, b and c in FIG. 9. Such setting of the characteristics permits discharge of the discharge lamp to be started without using any ballast, resulting in the discharge current being restricted to an allowable level or below and a stable operation point being ensured during a steady state.

The illustrated embodiment, as described above, is constructed in the manner that the resistance of each of the resistors R2 and R3 and the Zener voltage Vz of the Zener diode ZD1 are selected so as to permit the output voltage V1 of the voltage dividing circuit constituted by the resistors R2 and R3 to exceed the Zener voltage Vz to feed the thyristor Th1 with a trigger signal only when the output voltage of the generator 11 is higher than the rated voltage VL of the discharge lamp 12. Such construction leads to generation of a high-voltage pulse only during starting of the discharge lamp 12 and extinguishing of the high-voltage pulse when the discharge lamp starts discharge to reduce the output voltage of the generator 11 to a level equal to a rated value thereof or below. This keeps a useless high-voltage pulse from being generated after lighting of the discharge lamp to affect the discharge lamp and prevents the output of the generator from being wasted.

Such drooping characteristics as indicated at the curve (1) in FIG. 9, as described above, may be readily exhibited by suitably setting the number of turns of the armature winding or coil of the generator 11 or adjusting a polar arc angle of magnetic poles of each of both rotor and stator of the generator so as to increase a leakage flux flowing through magnetic poles rendered adjacent to each other when the magnetic poles of the rotator are rendered opposite to those of the stator. In particular, when the generator 11 is constituted by AC magneto, adjustment of the number of turns of the armature coil and/or the polar arc angle of the magnetic poles of the stator permit the drooping characteristics passing through the points a, b and c to be readily provided.

In the illustrated embodiment, the bypass capacitor 14 is connected in parallel across the generator 11. Such connection permits a pulse current to flow through the armature coil of the generator 11, to thereby prevent generation of loss in the armature coil, when the high-voltage pulse Vp is generated. Thus, energy of the high-voltage pulse Vp can be effectively utilized to efficiently accomplish starting of the discharge lamp 12.

In addition, the bypass capacitor 14 exhibits an impedance reduced with respect to the high-voltage pulse Vp, so that connection of the bypass capacitor 14 across the generator 11 prevents a high voltage from being applied to the armature coil of the generator 11 when the high-voltage pulse Vp is generated, resulting in facilitating a design for insulation of the generator 11.

Also, connection of the bypass capacitor 14 across the generator 11 permits a leading phase current flowing through the armature coil of the generator 11 to carry out a magnetization action, to thereby increase an output voltage of the generator 11. Such an increase in output voltage of the generator, when a step-up transformer 13A is arranged on an output step or stage of the pulse generation circuit 13 to generate a high-voltage pulse across the secondary winding W2 of the step-up transformer 13A, reduces a boosting ratio of the transformer, to thereby reduce an impedance of the secondary winding of the step-up transformer acting as a load of the generator, resulting in loss generated in the step-up transformer 13A being reduced, so that the discharge lamp 12 may be lighted by means of the generator downsized correspondingly.

Figure 3:
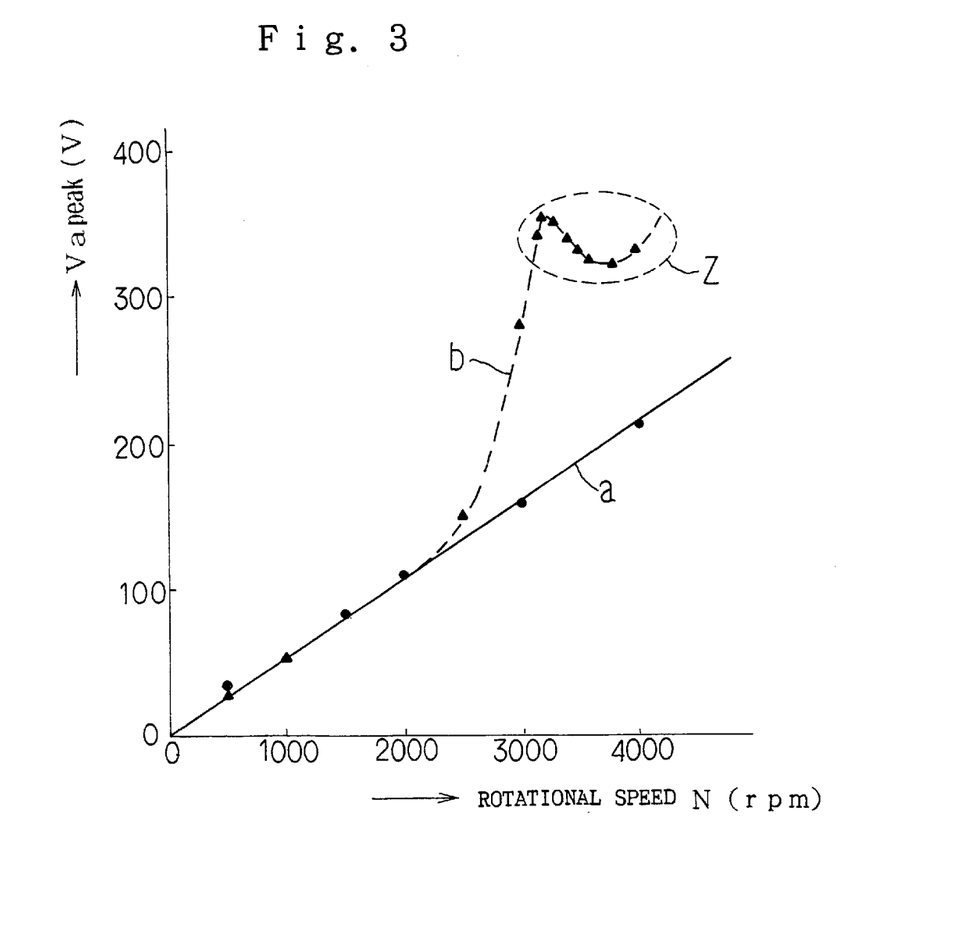
FIG. 3 is a graphical representation showing an example of relationship between a peak value of a no-load output voltage of a generator incorporated in the present invention and a rotational speed of the generator obtained when a bypass capacitor is not arranged and when such a bypass capacitor is arranged.

FIG. 3 shows relationship between the peak value $Va_{peak}$ of the no-load output voltage Va of the generator 11 and a rotational speed N of the generator 11, wherein a curve a indicates the relationship obtained when the capacitor 14 is not arranged and a curve b indicates the relationship obtained when the capacitor 14 is provided.

Figure 4:
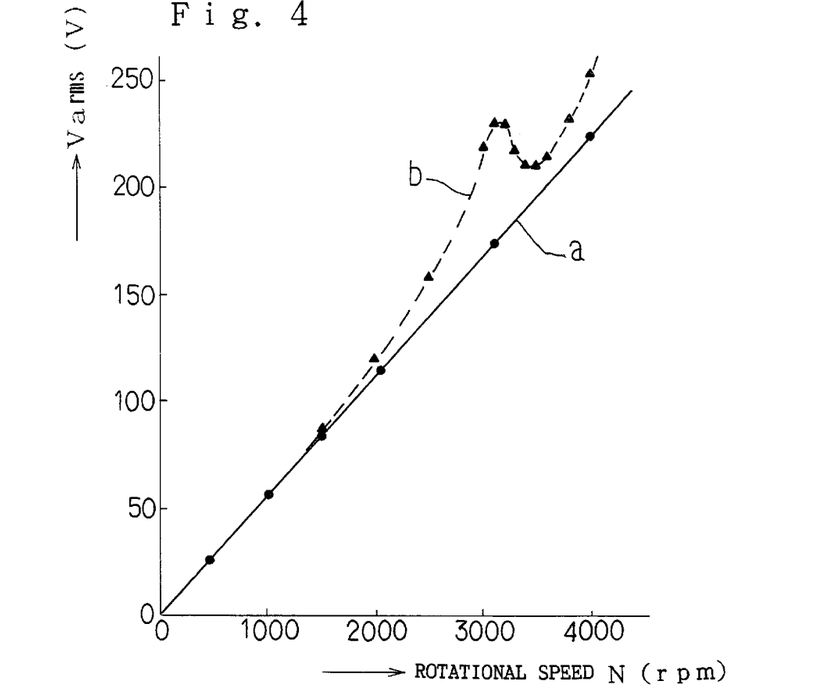
FIG. 4 is a graphical representation showing an example of relationship between a root mean square value of a no-load output voltage of a generator incorporated in the present invention and a rotational speed of the generator obtained when a bypass capacitor is not arranged and when such a bypass capacitor is arranged.

FIG. 4 shows relationship between a root mean square value $Va_{rms}$ of the no-load output voltage Va of the generator 11 and the rotational speed N of the generator 11, wherein curves a and b indicate relationships obtained when the capacitor 14 is not arranged and is arranged, respectively.

Figure 5:
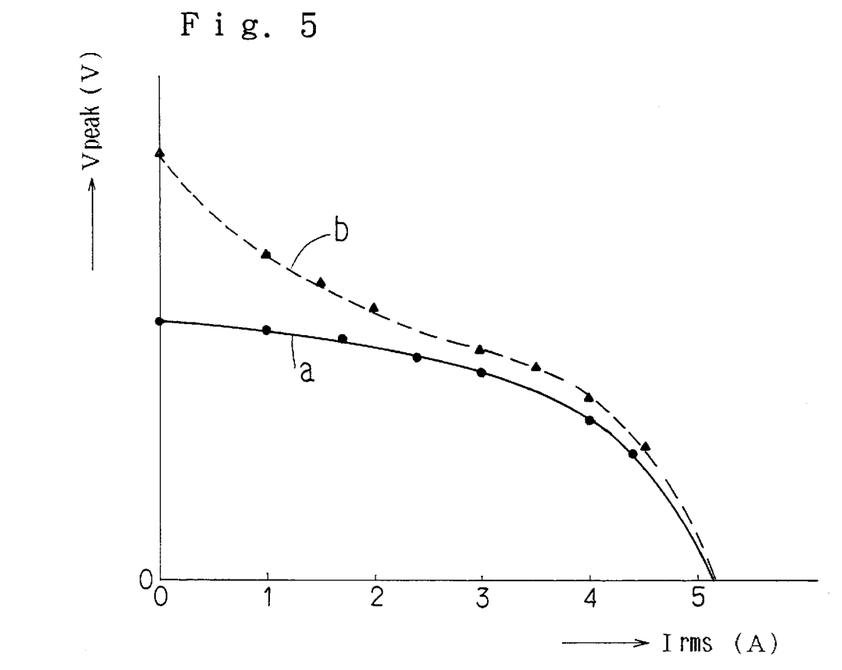
FIG. 5 is a graphical representation showing an example of relationship between a peak value of an output voltage of a generator incorporated in the present invention and a root mean square value of a load current obtained when a bypass capacitor is not arranged and when such a bypass capacitor is arranged.

FIG. 5 shows relationship between a peak value $V_{peak}$ of the output voltage V of the generator 11 and a root mean square value $I_{rms}$ of a load current I of the generator 11, wherein a curve a indicates the relationship obtained when the capacitor 14 is not arranged and a curve b indicates the relationship obtained when the capacitor 14 is provided.

Figure 6:
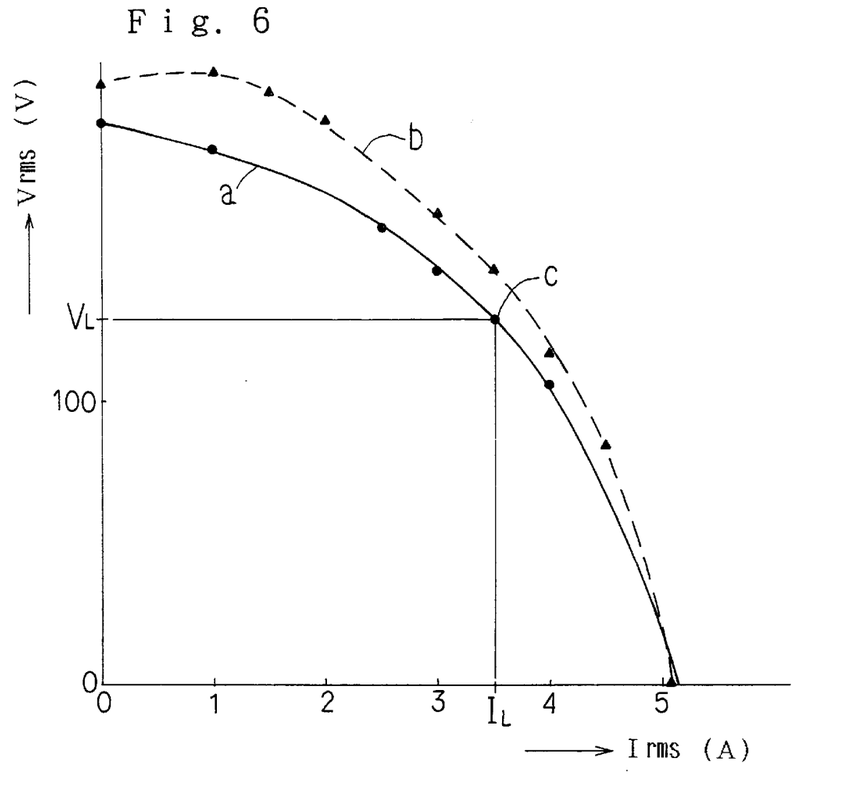
FIG. 6 is a graphical representation showing an example of relationship between a root mean square value of an output voltage of a generator incorporated in the present invention and a root mean square value of a load current obtained when a bypass capacitor is not arranged and when such a bypass capacitor is arranged.

Also, FIG. 6 shows relationship between a root mean square value $V_{rm}$ of the output voltage V of the generator 11 and the root-mean-square value $I_{rms}$ of the load current I of the generator 11, wherein a curve a indicates the relationship obtained when the capacitor 14 is not arranged and a curve b indicates the relationship obtained when the capacitor 14 is provided.

Figure 7:
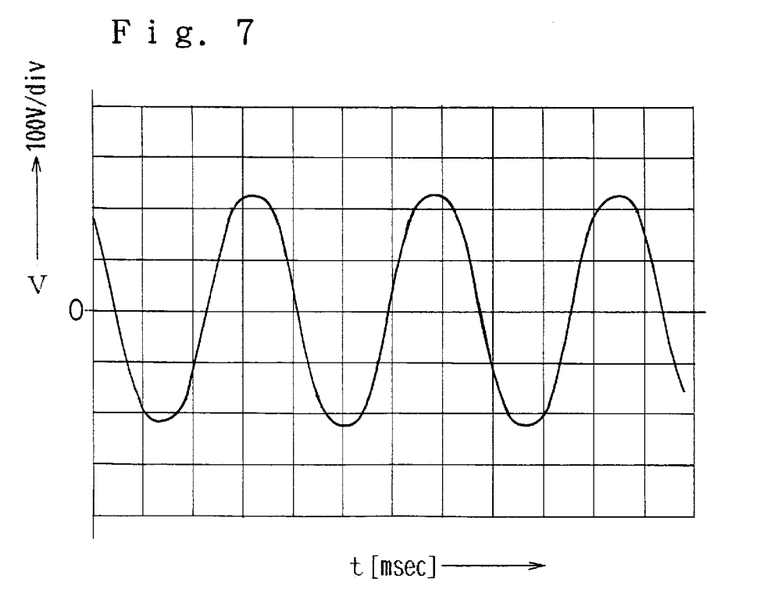
FIG. 7 is a waveform diagram showing a waveform of a no-load output voltage obtained when a capacitor is not connected across a generator incorporated in the present invention.
Figure 8:
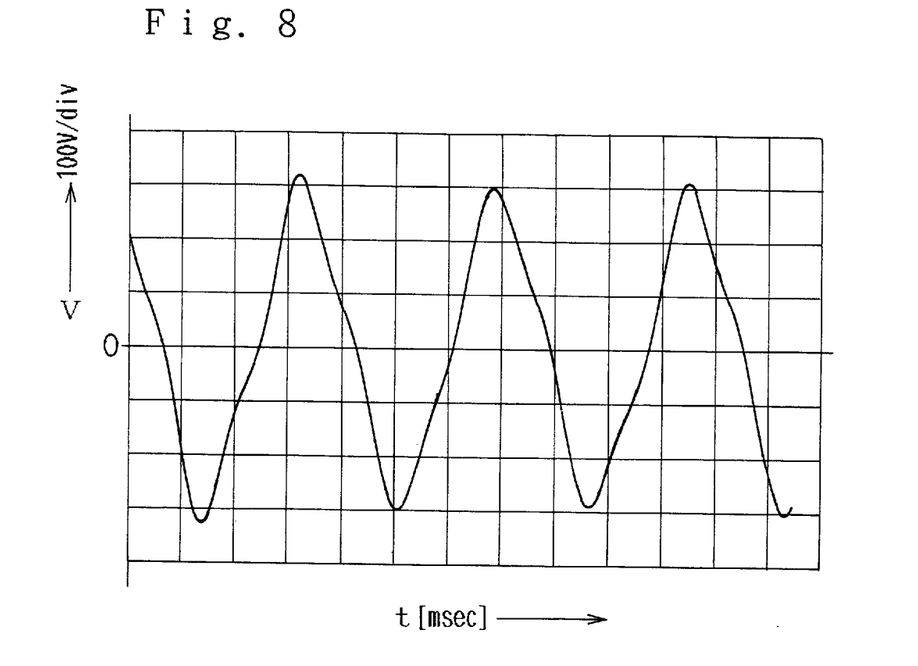
FIG. 8 is a waveform diagram showing a waveform of a non-load output voltage obtained when a capacitor is connected across a generator incorporated in the present invention.

Further, FIGS. 7 and 8 show a waveform of the output voltage V of the generator 11 obtained when keeping a rotational speed of an internal combustion engine constant, in the case that the capacitor 14 is not arranged and is arranged, respectively.

As noted from FIGS. 3 to 6, as well as FIGS. 7 and 8, connection of the capacitor 14 across the generator 11 permits a leading phase current flowing through the capacitor to exhibit a magnetization action of increasing both root mean square value and peak value of the output voltage of the generator 11. This results in a size of the generator which has the bypass capacitor connected thereacross being reduced as compared with that of the generator which is not provided with the capacitor, when it is used for lighting the discharge lamp.

Also, such arrangement of the bypass capacitor 14, as shown in FIGS. 3 and 4, permits a portion in which a variation of the peak value and root mean square value of the no-load output voltage of the generator to the rotational speed of the generator is decreased in width to be formed in a region in which the rotational speed of the generator 11 exceeds a predetermined value or 3000 rpm in an example of each of FIGS. 3 and 4. In the example of FIG. 3, the region is indicated as an area surrounded by an ellipse of broken lines. Thus, when a rotational speed of the generator is set so as to permit the pulse generation circuit 13 to generate a high-voltage pulse by means of a no-load output voltage of the generator in this portion or, for example, when it is set to be 3600 rpm in the example of FIG. 3, the pulse generation circuit 13 may generate a high-voltage pulse stabilized with respect to a variation in rotational speed of the internal combustion engine, to thereby constantly ensure stable starting of the discharge lamp.

In the illustrated embodiment, the generator 11 is constituted by an AC magneto as described above. Alternatively, any suitable generator other than an AC magneto may be used for this purpose, so long as it exhibits the output voltage-output current characteristics passing through the points a, b and c shown in FIG. 9. For example, it may be constituted by an induction generator including a magneto and an armature coil arranged on a side of a stator and an inductor arranged on a side of a rotor wherein an AC voltage is induced across the armature coil depending on a variation in magnetic flux due to rotation of the inductor. Also, a synchronous generator, a DC generator or the like may be suitably used for this purpose.

In the pulse generation circuit 13 constructed as shown in FIG. 2, the secondary winding W2 of the step-up transformer 13A is inserted into a passage for a load current of the generator 11, so that the secondary winding acts as a load of the generator. However, in the illustrated embodiment, the bypass capacitor 14 connected across the generator 11 exhibits a magnetization function of increasing an output voltage of the generator, to thereby decrease a turn ratio or boosting ratio of the step-up transformer 13A required for generating a high-voltage pulse of a predetermined level, resulting in the number of turns of the secondary winding W2 of the step-up transformer 13A being decreased. Such a decrease in the number of turns of the secondary winding of the step-up transformer leads to a decrease in impedance of the secondary winding, to thereby reduce loss generated across the secondary winding. Thus, the construction of the pulse generation circuit 13 shown in FIG. 2 wherein the bypass capacitor 14 is connected across the generator 11 permits the pulse generation circuit 13 to generate a high-voltage pulse having a peak value required for starting of the discharge lamp 12 while ensuring small-sizing of the generator 11 and a reduction in rated output voltage of the generator as compared with the construction wherein the bypass capacitor 14 is eliminated from the pulse generation circuit 13 without being connected across the generator 11.

The illustrated embodiment, as described above, is so constructed that the discharge switch 13a is fed with a trigger signal when an output voltage of the generator 11 reaches a predetermined level or magnitude which is set below the peak value of the no-load output voltage of the generator and above a peak value of an output voltage of the generator obtained while a rated discharge current flows through the discharge lamp 12. Such construction effectively keeps a high-voltage pulse from being generated from the pulse generation circuit 13 when the output voltage of the generator 11 is reduced to a level or magnitude below a rated value thereof after discharge of the discharge lamp is started, to thereby prevent a useless high-voltage pulse from being generated after lighting of the discharge lamp to adversely affect the discharge lamp and the output of the generator from being wasted.

In the illustrated embodiment, the pulse generation circuit 13 may be constructed in any desired manner so long as it is adapted to generate a high-voltage pulse using the generator 11 as a power supply therefor.

Figure 10:
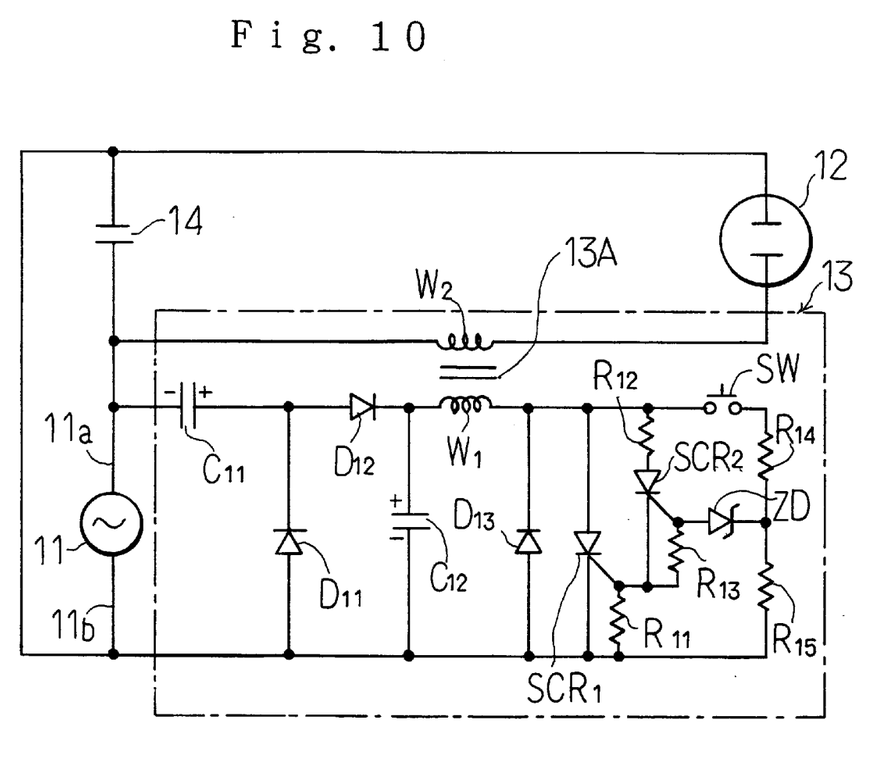

Referring now to FIG. 10, a pulse generation circuit which may be incorporated in another embodiment of an internal combustion engine-driven discharge lamp lighting apparatus according to the present invention is illustrated embodiment. A pulse generation circuit generally designated at reference numeral 13 includes a step-up transformer 13A, a pulse generation capacitor C12 arranged on a primary side of the step-up transformer 13A, a capacitor charging circuit for charging the pulse generation capacitor C12 at one of polarities by means of an output voltage of a generator 11, a discharge switch constituted by a thyristor SCR1 arranged for discharging charges in the pulse generation capacitor C12 through a primary winding W1 of the step-up transformer 13A when it is turned on, a start switch SW kept closed until a discharge lamp 12 is lighted in starting operation, and a discharge switch trigger circuit for feeding the discharge switch with a trigger signal through the starting switch SW to turn on the discharge switch every time when the output voltage of the generator 11 reaches a preset level. In the illustrated embodiment as well, the output voltage of the generator 11 is applied to the discharge lamp 12 through a secondary winding W2 of the step-up transformer 13A.

More particularly, in the pulse generation circuit 13 shown in FIG. 10, a capacitor C11 and the capacitor C12 cooperate with diodes D11 and D12 to constitute a voltage doubler rectifying circuit commonly known in the art, wherein an input terminal of the input-side capacitor C11 of the voltage doubler rectifying circuit and a low potential terminal of the output-side capacitor C12 thereof are connected to one output terminal 11a of the generator 11 and the other output terminal 11b thereof, respectively. A high potential terminal of the output-side capacitor C12 of the voltage doubler rectifying circuit is connected to one end of the primary winding W1 of the step-up transformer 13A and the discharge thyristor SCR1 having an anode arranged so as to face the primary winding W1 of the step-up transformer 13A is connected between the other end of the primary winding W1 and the low potential terminal of the capacitor C12. The thyristor SCR1 has a resistor R11 connected to a gate-cathode circuit thereof and a diode D13 connected in antiparallel to an anode-cathode circuit thereof. The thyristor SCR1 has a gate connected to a cathode of a trigger thyristor SCR2, of which an anode is connected through a resistor R12 to the other end of the primary winding W1 of the step-up transformer 13A. The thyristor SCR2 has a gate connected to an anode of a Zener diode ZD and a resistor R13 connected to a gate-cathode circuit thereof. Between the other end of the primary winding W1 of the step-up transformer 13A and the low potential terminal of the capacitor C12 is connected a resistance type voltage dividing circuit constituted by resistors R14 and R15 through a start switch SW. The resistance type voltage dividing circuit has a voltage dividing point connected to a cathode of the Zener diode ZD. The start switch SW is constituted by a manual operation switch which is closed during starting of the discharge lamp and rendered open after starting of the discharge lamp. The start switch SW may be constituted by a push button switch by way of example.

The secondary winding W2 of the step-up transformer 13A is connected at one end thereof to a connection between one output terminal 11a of the generator 11 and the input-side capacitor C11. Between the other end of the secondary winding W2 of the step-up transformer 13A and the other output terminal 11b of the generator 11 is connected the discharge lamp 12 increased in start voltage such as a metal halide lamp or the like.

Thus, the pulse generation circuit 13 shown in FIG. 10 is so constructed that charges in the capacitor C12 charged by the output voltage of the generator 11 are discharged through the thyristor SCR1 and the primary winding W1 of the step-up transformer 13A to induce a high-voltage pulse across the secondary winding W2 of the step-up transformer 13A, resulting in the high-voltage pulse thus induced being superposed on the output voltage of the generator, followed by application of the high-voltage pulse thus superposed to the discharge lamp 12.

In the discharge lamp lighting apparatus shown in FIG. 10, when the generator 11 generates a voltage, the capacitor C12 is charged to a level of a voltage twice as high as a peak value of the output voltage of the generator 11 at a polarity shown in FIG. 10. When the start switch SW1s closed, the Zener diode ZD is turned on to trigger the thyristor SCR2, so that the thyristor SCR2 is turned on to feed the thyristor SCR1 with a trigger signal. This permits the thyristor SCR1 to be turned on, to thereby provide a discharge circuit for the capacitor C12, resulting in charges in the capacitor C12 being discharged through the primary winding W1 of the step-up transformer 13A and the thyristor SCR1. The discharge leads to a variation in primary current of the step-up transformer 13A, so that a high-voltage pulse may be generated across the secondary winding W2 of the step-up transformer. The high-voltage pulse is superposed on the output voltage of the generator 11 and applied to the discharge lamp 12, so that discharge of the discharge lamp 12 is started, resulting in the lamp 12 being lighted. After discharge of the discharge lamp is thus started and the switch SW is rendered open, the output voltage of the generator 11 is applied through the secondary winding W2 of the step-up transformer 13A to the discharge lamp 12, to thereby keep the discharge lamp 12 lighted.

As described above, in the embodiment shown in FIG. 10, the high-voltage pulse is applied during a period of time for which the start switch is kept closed and generation of the high-voltage pulse is interrupted when the start switch is open after lighting of the discharge lamp.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An internal combustion engine-driven discharge lamp lighting apparatus, comprising:

an internal combustion engine;

a generator driven by said internal combustion engine to generate an output voltage;

a pulse generation circuit for generating a high-voltage pulse at least during starting of a discharge lamp using said generator as a power supply therefor; and a bypass capacitor connected in parallel across said generator to bypass said high-voltage pulse from said generator;

said output voltage of said generator and said high-voltage pulse being applied to said discharge lamp while being superposed on each other;

said high-voltage pulse of said pulse generation circuit having a magnitude required for permitting a voltage applied to said discharge lamp during starting of said discharge lamp to be increased to a magnitude equal to a break-down voltage of said discharge lamp or more;

said generator being constructed so as to have output voltage-output current characteristics exhibiting drooping characteristics;

said output voltage-output current characteristics of said generator being set so as to permit a magnitude of each of a voltage across said discharge lamp and a discharge current of said discharge lamp at a steady state to be kept within a rated range;

said generator having a short-circuit current set in a magnitude so as to restrict a magnitude of the discharge current of said discharge lamp flowing immediately after starting of discharge of said discharge lamp to an allowable value or below.

2. An internal combustion engine-driven discharge lamp lighting apparatus, comprising:

an internal combustion engine;

a generator driven by said internal combustion engine to generate an output voltage;

a pulse generation circuit for generating a high-voltage pulse superposed on said output voltage of said generator;

said high-voltage pulse being generated at least during starting of a discharge lamp using said generator as a power supply therefor; and a bypass capacitor connected in parallel across said generator to bypass said high-voltage pulse from said generator;

said pulse generation circuit including a step-up transformer including a primary winding and a secondary winding, a pulse generation capacitor arranged on a primary side of said step-up transformer, a capacitor charging circuit for charging said pulse generation capacitor into one of polarities by means of said output voltage of said generator, a discharge switch for discharging charges in said pulse generation capacitor through said primary winding of said step-up transformer when it is turned on, a discharge switch trigger circuit for feeding said discharge switch with a trigger signal to turn on said discharge switch when a magnitude of said output voltage of said generator reaches a predetermined level;

said pulse generation circuit being constructed so as to permit said high-voltage pulse to be induced on said secondary winding of said step-up transformer due to discharge of said pulse generation capacitor;

said high-voltage pulse of said pulse generation circuit having a magnitude required for permitting a magnitude of a voltage applied to said discharge lamp during starting of discharge of said discharge lamp to be equal to a break-down voltage of said discharge lamp or more;

said output voltage of said generator being applied through said secondary winding of said step-up transformer to said discharge lamp;

said generator being constructed so as to have output voltage-output current characteristics exhibiting drooping characteristics;

said output voltage-output current characteristics of said generator being set so as to permit a magnitude of each of a voltage across said discharge lamp and a discharge current of said discharge lamp at a steady state to be kept within a rated range;

said generator having a short-circuit current set in a magnitude so as to restrict a magnitude of the discharge current of said discharge lamp flowing immediately after starting of discharge of said discharge lamp to an allowable value or below.

3. An internal combustion engine-driven discharge lamp lighting apparatus as defined in claim 2, wherein said predetermined level is defined to be below a peak value of the output voltage of said generator at a non-load state and above a peak value of the output voltage of said generator while a rated discharge current flows through said discharge lamp.

4. An internal combustion engine-driven discharge lamp lighting apparatus, comprising:

an internal combustion engine;

a generator driven by said internal combustion engine to generate an output voltage of one half cycle and an output voltage of the other half cycle;

a pulse generation circuit for generating a high-voltage pulse superposed on said output voltage of said generator;

said high-voltage pulse being generated at least during starting of a discharge lamp using said generator as a power supply therefor; and a bypass capacitor connected in parallel across said generator to bypass said high-voltage pulse from said generator;

said pulse generation circuit including a step-up transformer including a primary winding and a secondary winding, a pulse generation capacitor arranged on a primary side of said step-up transformer, a capacitor charging circuit for charging said pulse generation capacitor into one of polarities by means of said output voltage of one half cycle generated by said generator, a discharge switch for discharging charges in said pulse generation capacitor through said primary winding of said step-up transformer when it is turned on, a discharge switch trigger circuit for feeding said discharge switch with a trigger signal to turn on said discharge switch when a magnitude of said output voltage of the other half cycle generated by said generator reaches a predetermined level;

said pulse generation circuit being constructed so as to permit said high-voltage pulse to be induced on said secondary winding of said step-up transformer due to discharge of said pulse generation capacitor;

said high-voltage pulse of said pulse generation circuit having a magnitude required for permitting a magnitude of a voltage applied to said discharge lamp during starting of discharge of said discharge lamp to be equal to a break-down voltage of said discharge lamp or more;

said output voltage of said generator being applied through said secondary winding of said step-up transformer to said discharge lamp;

said generator being constructed so as to have output voltage-output current characteristics exhibiting drooping characteristics;

said output voltage-output current characteristics of said generator being set so as to permit a magnitude of each of a voltage across said discharge lamp and a discharge current of said discharge lamp at a steady state to be kept within a rated range;

said generator having a short-circuit current set in a magnitude so as to restrict a magnitude of the discharge current of said discharge lamp flowing immediately after starting of discharge of said discharge lamp to an allowable value or below.

5. An internal combustion engine-driven discharge lamp lighting apparatus as defined in claim 4, wherein said predetermined level is defined to be below a peak value of the output voltage of said generator at a non-load state and above a peak value of the output voltage of said generator while a rated discharge current flows through said discharge lamp.

6. An internal combustion engine-driven discharge lamp lighting apparatus, comprising:

an internal combustion engine;

a generator driven by said internal combustion engine to generate an output voltage;

a pulse generation circuit for generating a high-voltage pulse superposed on said output voltage of said generator;

said high-voltage pulse being generated at least during starting of a discharge lamp using said generator as a power supply therefor; and a bypass capacitor connected in parallel across said generator to bypass said high-voltage pulse from said generator;

said pulse generation circuit including a step-up transformer including a primary winding and a secondary winding, a pulse generation capacitor arranged on a primary side of said step-up transformer, a capacitor charging circuit for charging said pulse generation capacitor into one of polarities by means of said output voltage of said generator, a discharge switch for discharging charges in said pulse generation capacitor through said primary winding of said step-up transformer when it is turned on, a starting switch kept closed until said discharge lamp is lighted during starting of said discharge lamp, and a discharge switch trigger circuit for feeding said discharge switch with a trigger signal through said starting switch to turn on said discharge switch every time when said output voltage of said generator reaches a predetermined level;

said pulse generation circuit being constructed so as to permit said high-voltage pulse to be induced on said secondary winding of said step-up transformer due to discharge of said pulse generation capacitor;

said high-voltage pulse of said pulse generation circuit having a magnitude required for permitting a magnitude of a voltage applied to said discharge lamp during starting of discharge of said discharge lamp to be equal to a break-down voltage of said discharge lamp or more;

said output voltage of said generator being applied through said secondary winding of said step-up transformer to said discharge lamp;

said generator being constructed so as to have output voltage-output current characteristics exhibiting drooping characteristics;

said output voltage-output current characteristics of said generator being set so as to permit a magnitude of each of a voltage across said discharge lamp and a discharge current of said discharge lamp at a steady state to be kept within a rated range;

said generator having a short-circuit current set in a magnitude so as to restrict a magnitude of the discharge current of said discharge lamp flowing immediately after starting of discharge of said discharge lamp to an allowable value or below.

* * * * *

UNITED STATES PATENT AND TRADEMARK OFFICE
CERTIFICATE OF CORRECTION

PATENT NO.  : 5,949,190
DATED       : September 7, 1999
INVENTOR(S) : Notsu

It is certified that error appears in the above-identified patent and that said Letters Patent is hereby corrected as shown below:

Column 11, Line 29, delete "$V_{rm}$" and insert --$V_{rms}$--.

Column 14, Line 5, delete "SW1s" and insert --SW--.

Signed and Sealed this

Eighth Day of February, 2000

Attest:

Q. TODD DICKINSON

*Attesting Officer*            *Commissioner of Patents and Trademarks*